May 17, 1927.  1,629,425
R. WARDHAUGH
DIRECTION INDICATOR FOR AUTOMOBILES
Filed March 27, 1925  2 Sheets-Sheet 1
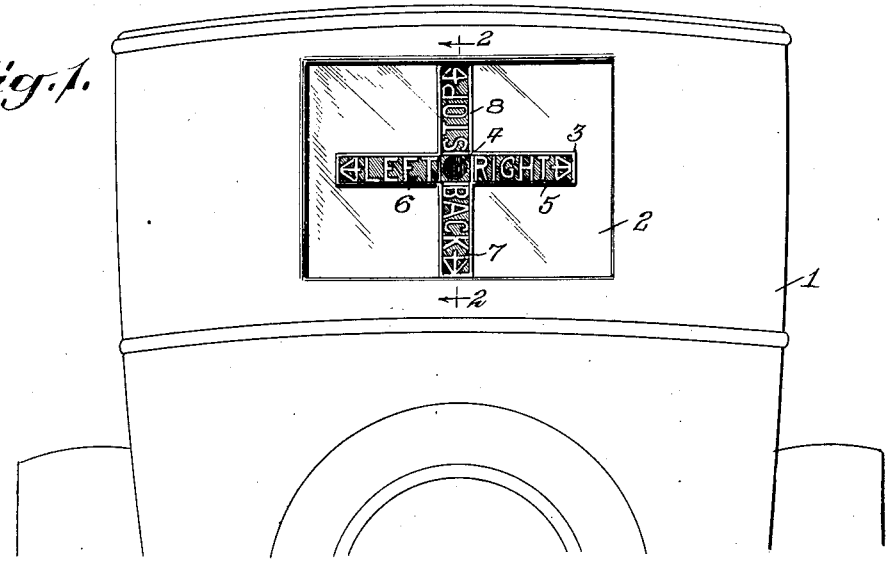
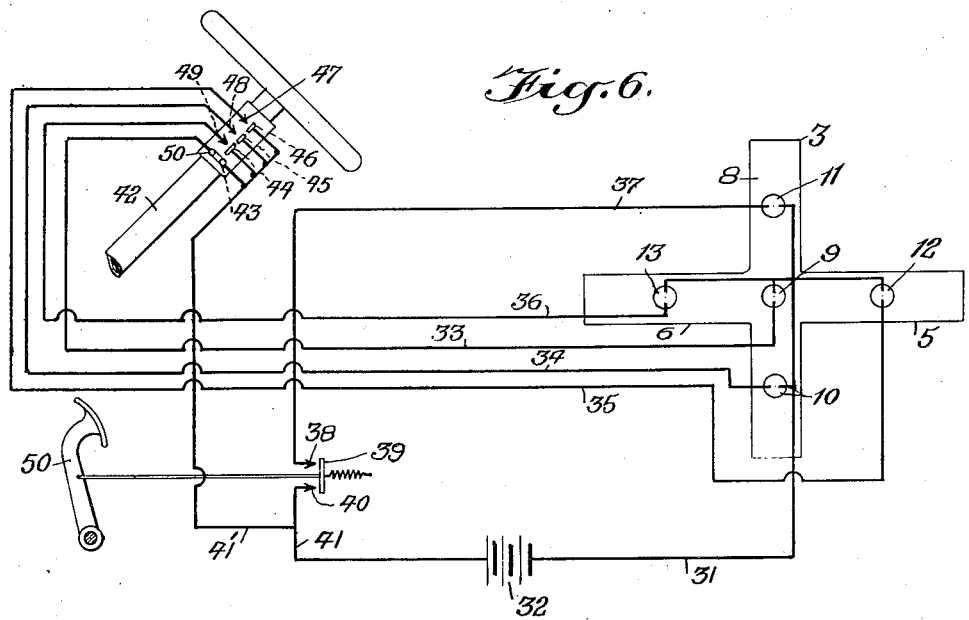
INVENTOR
Ralph Wardhaugh May 17, 1927. 1,629,425
R. WARDHAUGH
DIRECTION INDICATOR FOR AUTOMOBILES
Filed March 27, 1925 2 Sheets-Sheet 2
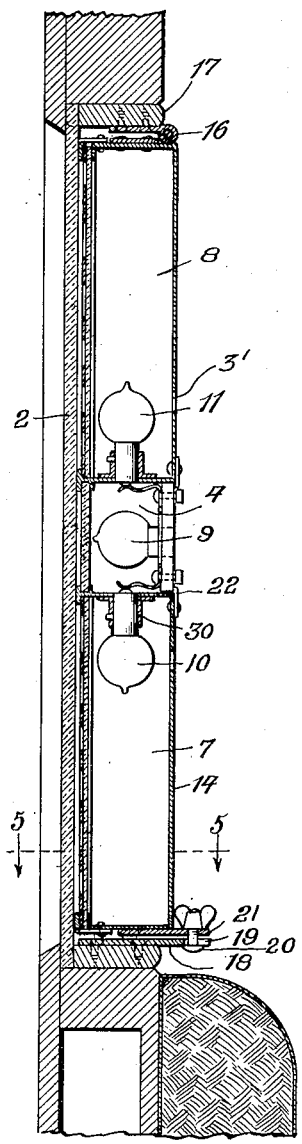
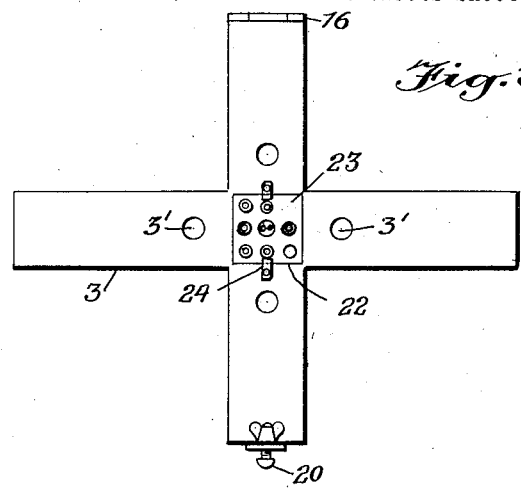
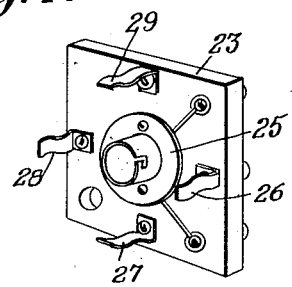
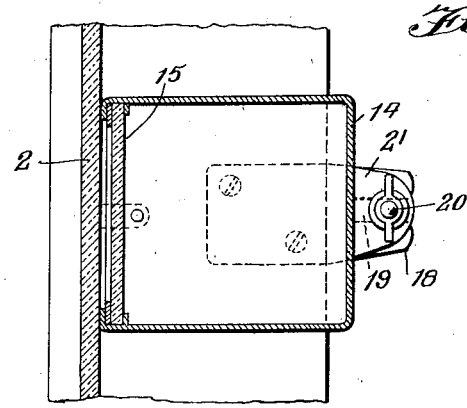
WITNESSES
INVENTOR
Ralph Wardhaugh
BY
ATTORNEYS Patented May 17, 1927.

1,629,425

UNITED STATES PATENT OFFICE.

RALPH WARDHAUGH, OF BROOKLYN, NEW YORK.

DIRECTION INDICATOR FOR AUTOMOBILES.

Application filed March 27, 1925. Serial No. 18,870.

This invention relates to automobile signalling devices and particularly to a direction indicator for the rear of automobiles and has for an object to provide a construction which may be used on closed cars for easily and quickly indicating the intention of the driver to a following car.

Another object of the invention is to provide an improved direction indicator for automobiles wherein a constant signal is maintained centrally of the indicator and signal means radiating therefrom in four directions for indicating the turning of the automobile or other action to be taken.

A further object, more specifically, is to provide a direction indicator for automobiles wherein the parts may be readily mounted in the rear window of a closed car and easily connected up to the steering post of the automobile so that the parts may function accurately and may be installed or removed without injuring the car.

In the accompanying drawings—

Figure 1 is a rear view of part of a closed car with an embodiment of the invention applied thereto.

Figure 2 is an enlarged fragmentary sectional view through Figure 1 on line 2—2.

Figure 3 is a rear view of the indicator shown in Figure 2, the same being on a reduced scale.

Figure 4 is an enlarged perspective view of an electric socket and certain switches embodying certain features of the invention.

Figure 5 is a transverse sectional view through Figure 2 on line 5—5, the same being on a somewhat enlarged scale.

Figure 6 is a diagram showing the arrangement of conductors.

Referring to the accompanying drawings by numerals, 1 indicates an automobile of any desired kind, as for instance, a closed car having a window 2. Arranged in the window 2 is a cross-shaped indicating member 3 which is connected with suitable wiring as shown in Figure 6 whereby member 3 may be properly illuminated through the action of the brake or through a manual actuation of switches on the steering post. As indicated in Figure 1, the structure shown in Figure 3 is provided with a central signal lamp compartment 4 and lamp compartments 5, 6, 7 and 8. Compartments 5 and 6 are provided with suitable indicating means to indicate right and left while the compartments 7 and 8 have the words "Back" and "Stop" arranged thereon. Interiorly of the structure 3 are arranged suitable lamps as hereinafter described for illuminating these different direction legends. Means have been provided as hereinafter described for permitting the driver of the car to close the circuit of any one of the lamps or all of the lamps at the same time.

As shown particularly in Figures 2, 3 and 4, lamps 9, 10 and 11 are provided in the chambers 4, 7 and 8 while similar lamps 12 and 13 are provided in the chambers or compartments 5 and 6. The structure 3 is provided with a cross-shaped housing 14 (Figures 3 and 5), said housing being preferably of metal and connected to the various glass panes 15 at the front by any suitable strips. On the glass panes 5 are arranged the various legends indicating direction as shown in Figure 1. A hinge 16 is connected to the upper end of the housing 14 and is also preferably connected to the upper member 17 of the frame of window 2. A plate 18 is connected to the lower member of the frame 2 by screws or other means, said plate having a bifurcated portion or slot 19 arranged at the front for accommodating the clamping screw 20 which is carried by an ear 21 connected with the frame 14 and projecting therefrom. By tightening the screw 20 when in the position shown in Figures 2 and 5, the parts are locked against movement. Whenever this screw is loosened, the frame 14 may be swung upwardly out of the way and then back again into position if desired. Centrally of the frame 14 is formed a socket or opening 22. In this socket or opening a plate 23 is fitted, said plate being held in place by suitable clamping members or latches 24. The plate 23 is preferably formed of insulating material, as for instance, fiber and carries an electric socket 25 as well as contact springs 26, 27, 28 and 29. A suitable lamp socket 30 is provided for each of the lamps 10 to 13 inclusive, said sockets permitting the central contact of the lamps to project into the chamber 4 so that when block 23 is inserted into position as shown in Figure 2, these spring contacts will engage the central contact of each lamp for closing the circuit at this point. From the various contacts 26 to 29 inclusive and socket 25, wires extend to a suitable source of current and to the steering post as shown in Figure 6. One side of the various lamp sockets may be grounded or may be connected to suitable return wires without departing from the spirit of the invention.

As indicated in Figure 6, a supply or bus conductor 31 extends from the source of current 32 to one side of the various lamps and from the opposite side extend suitable return wires. From lamps 9, 10, 12 and 13 extend wires 33, 34, 35 and 36. A wire 37 extends from one side of lamp 11 to a contact 38 co-acting with the contact bar 39, which bar also co-acts with a contact 40 connected with wire 41. An auxiliary wire 41' extends from the wire 41 to the upper part of the steering post 42 where it is connected to the various contacts 43, 44, 45 and 46. From the wiring just described, contacts 43 to 46 are continually charged and also contact 40. Wires 33 to 36 are connected to the respective contacts 47, 48, 49 and 50 so that whenever any of the switches associated with the contacts 43 to 46 are closed, current will flow. In Figure 6, the switch associated with contact 43 is shown closed whereby it will be noted that current will pass from battery 32 through wire 31 to lamp 9, through lamp 9 to wire 33 and through wire 33 to contact 50, contact 43, wire 41' and finally through wire 41 back to battery 32. Ordinarily, this lamp is maintained lighted at all times while the other lamps are lighted from time to time as needed. It will be noted that in order to light the lamp 11 which is positioned in the chamber 8 back of the word "Stop" it is necessary to operate the brake pedal 51 of the automobile. As soon as this has been done, the circuit will be closed through contacts 38, 39 and 40 and lamp 11 will remain lighted as long as the pedal 51 is depressed. When the driver expects to move backwardly, he will first close the circuit of lamp 10 by closing the switch on contact 45 and will then proceed to operate the car to move the same back the desired distance. If he desires to move to the left, the circuit of lamp 13 will be closed in a similar manner or if he desires to move to the right the circuit of lamp 12 will be closed. If desired, in a case of emergency or other reason, all of the switches at the contacts 43 to 46 might be simultaneously closed and, consequently, all of the indicating members on the structure 3 will be illuminated which would quickly attract the attention of a following car so that a rear end collision would be avoided. Holes 3' are provided in order that the driver may see when the various lamps 10, 11, 12 and 13 are lighted.

What I claim is:

1. A casing for direction indicators for automobiles comprising a body having a plurality of arms radiating from a central point, means in each of said arms for supporting an electric lamp, a block fitted into the center of the body at the juncture of said arms, an electric lamp socket carried by said block and a plurality of contacts carried by said block, said contacts projecting to a point to be engaged by the respective center contacts of the lamps in said arms.

2. A casing for direction indicators for automobiles, comprising a body including a plurality of hollow arms radiating from a central point, a removable block at said central point, an electric lamp carried by said block, and a plurality of spring contacts carried by said block projecting to a point near the respective hollow arms, and means in each of said hollow arms for supporting a lamp with its center contact in engagement with one of said spring contacts.

RALPH WARDHAUGH.